Dec. 20, 1966 L. PETERS ETAL 3,292,258
APPARATUS FOR THE FLUID CASTING OF DECORATIVE-SURFACED
BUTTER PATTIES
Original Filed Sept. 13, 1963 7 Sheets-Sheet 3
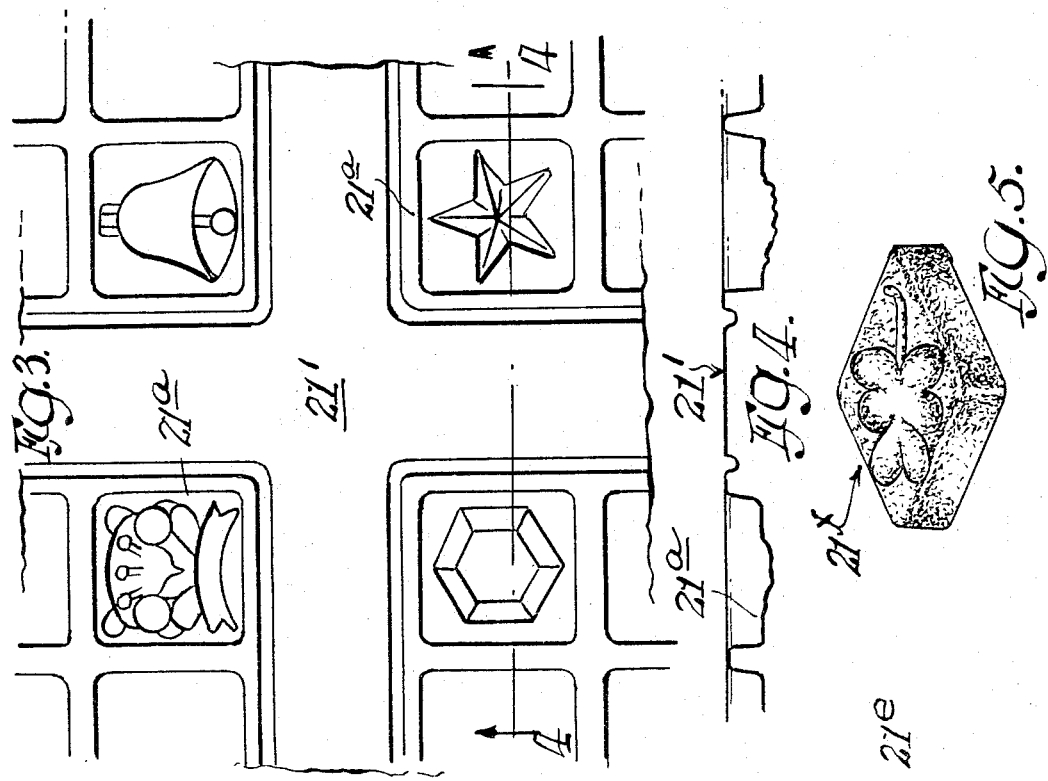
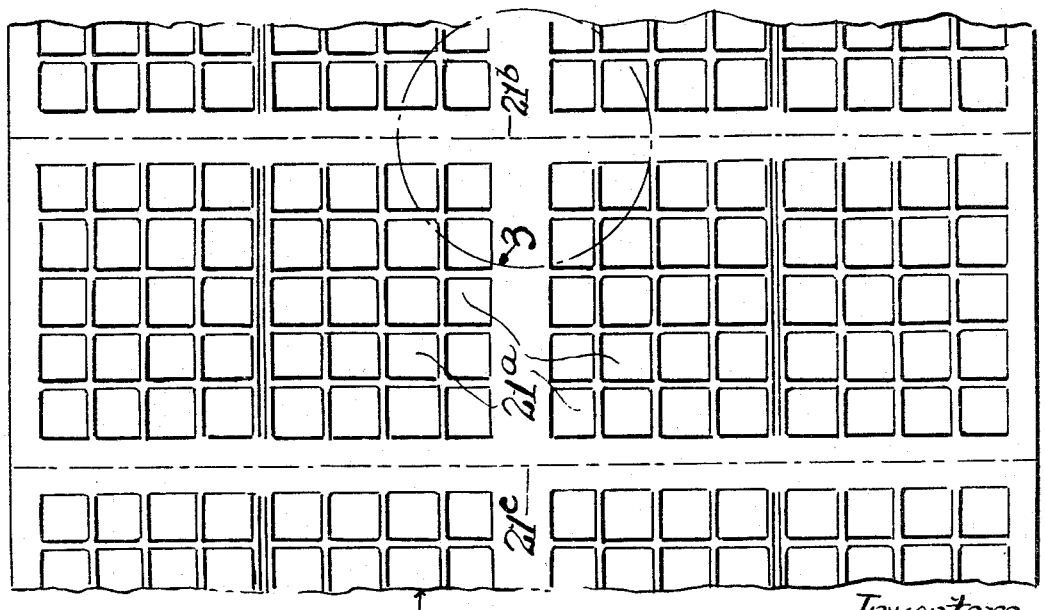

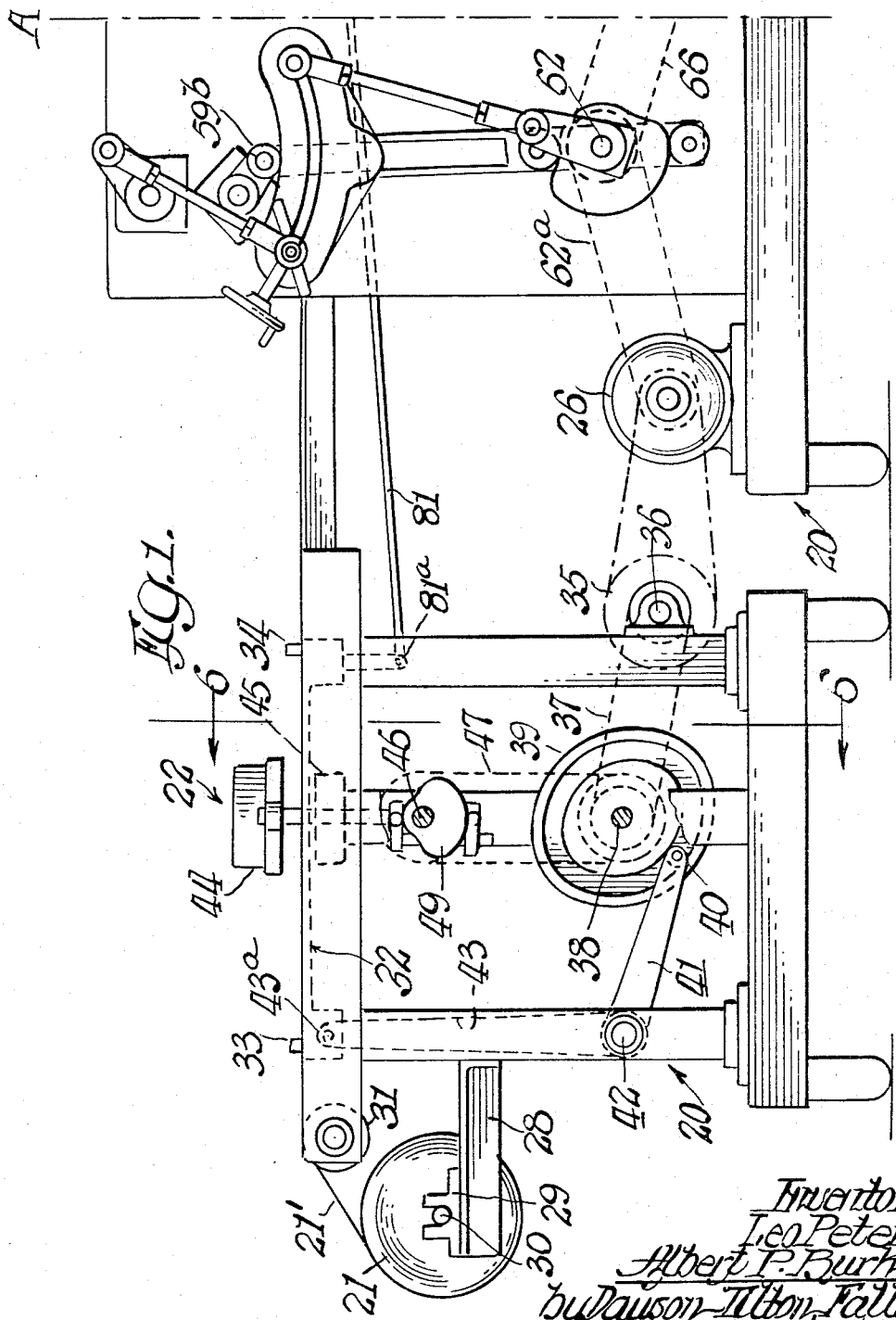

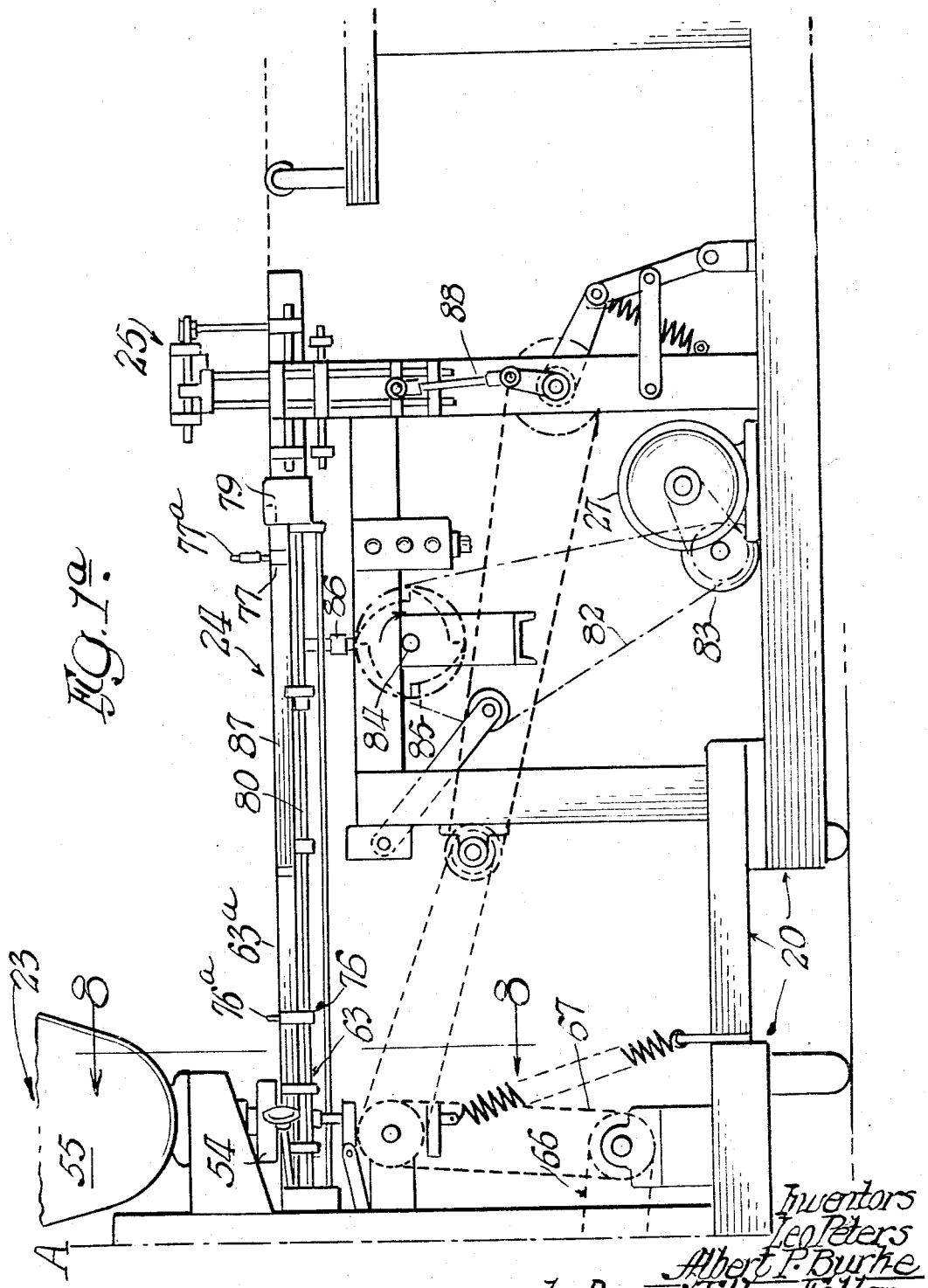

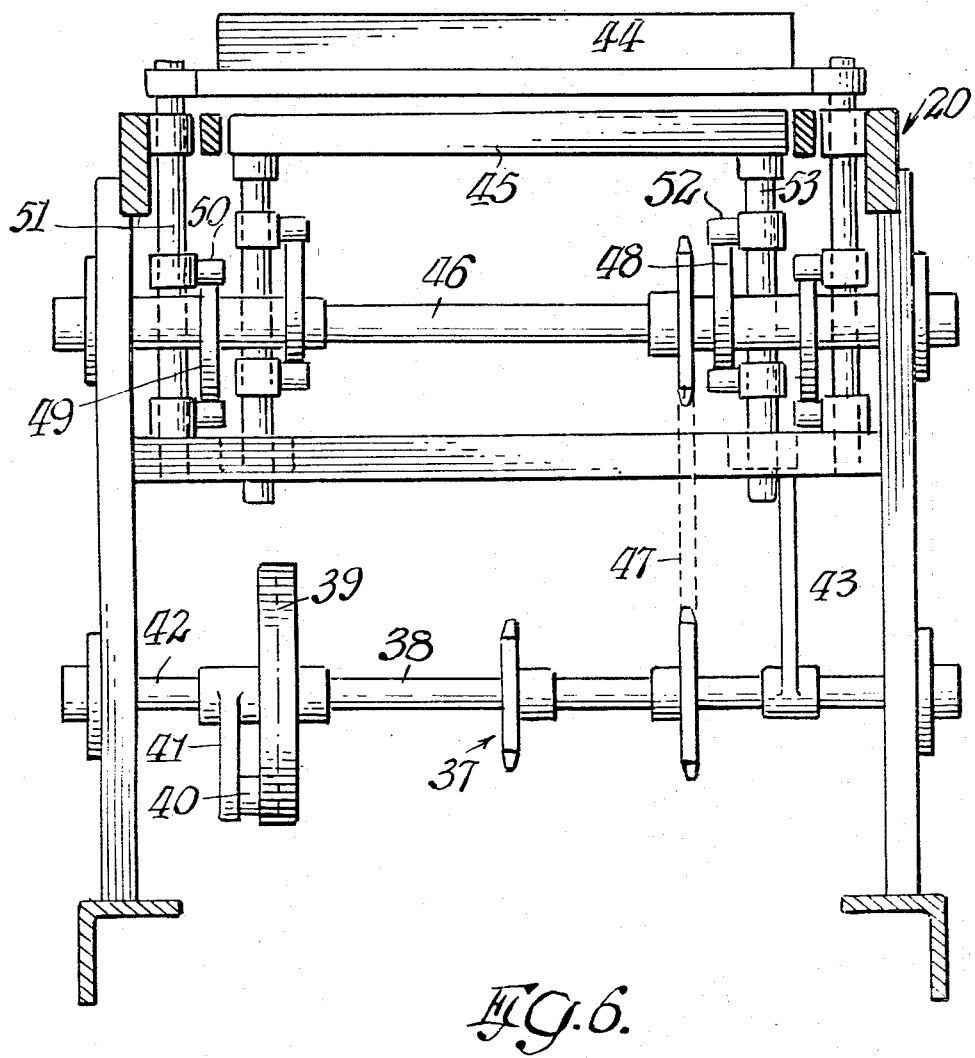

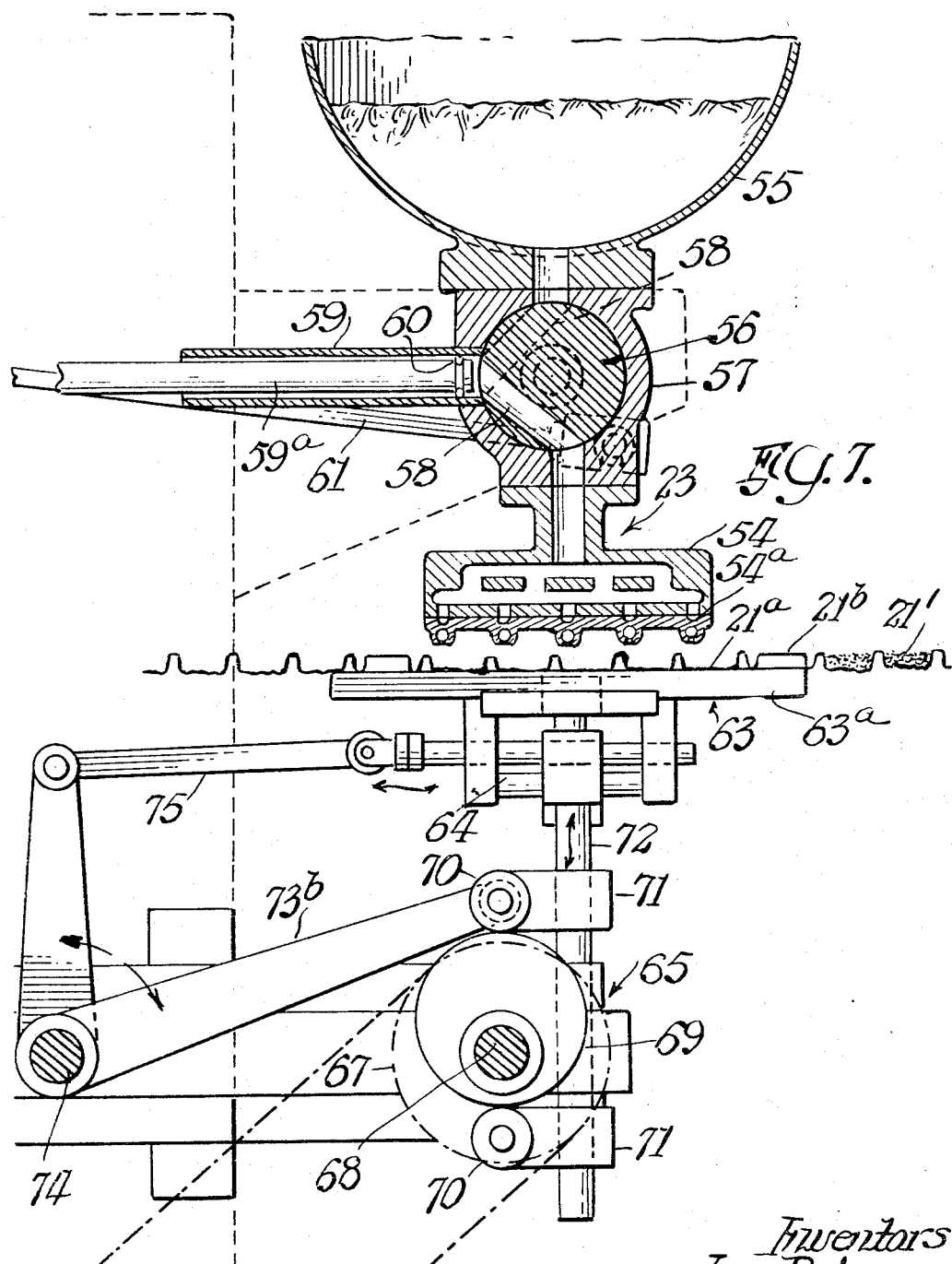

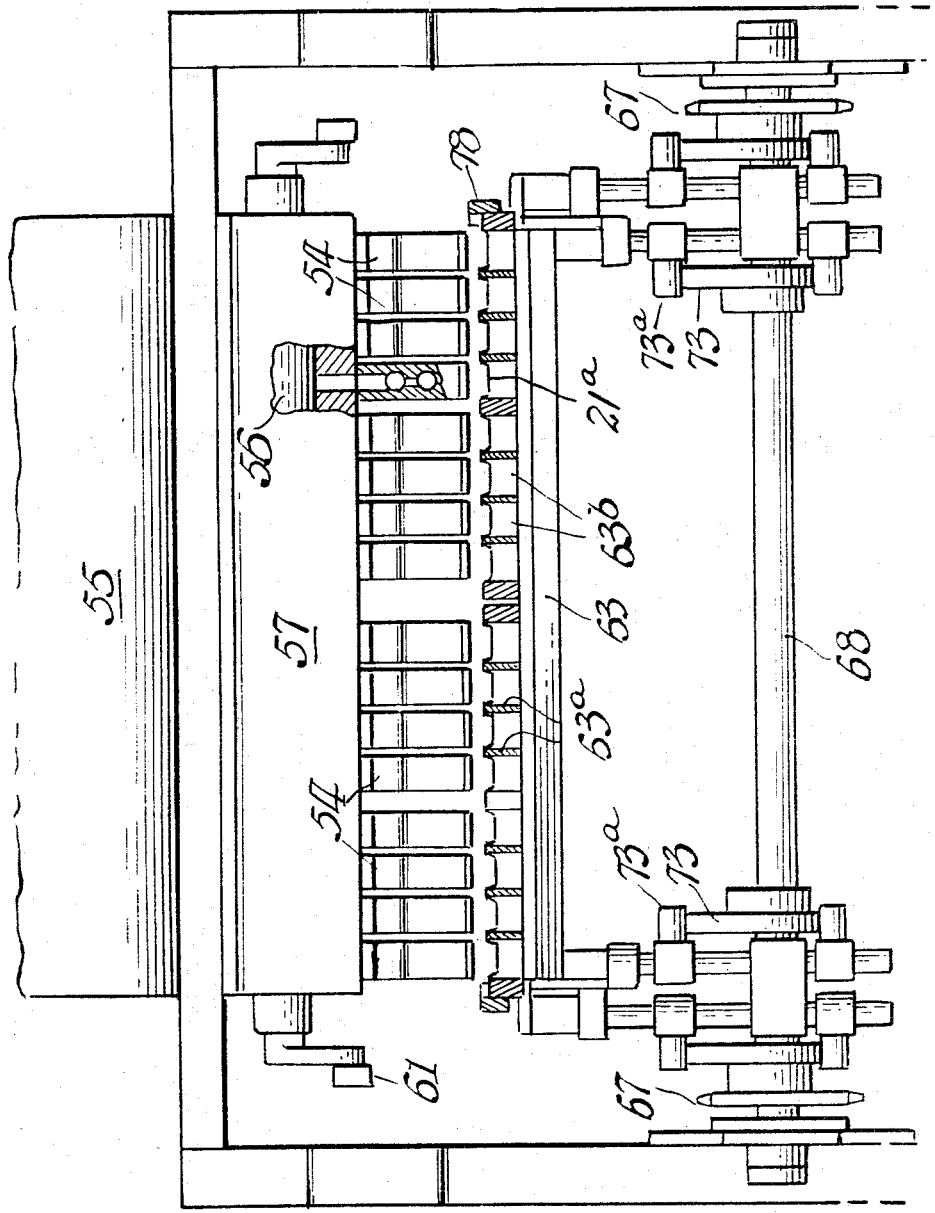

United States Patent Office 3,292,258
Patented Dec. 20, 1966

3,292,258
APPARATUS FOR THE FLUID CASTING OF DECORATIVE-SURFACED BUTTER PATTIES
Leo Peters, 750 Plymouth Road SE., Grand Rapids, Mich., and Albert P. Burke, Birmingham, Mich.; said Burke assignor to said Peters
Original application Sept. 13, 1963, Ser. No. 308,785. Divided and this application Apr. 13, 1965, Ser. No. 458,501
5 Claims. (Cl. 31—7)

This invention relates to an apparatus for the fluid casting of decorative-surfaced butter patties and is a division of application Serial No. 308,785, filed September 13, 1963, now abandoned.

One of the most elegant of the ancient culinary arts was the serving of individual service-sized patties of butter in shapes that delight the eye, enhance the decor of a festive meal, and extend the motif of a commemorative dinner. To practice this art, the standard procedure has been to press a piece of butter in a one- or two-sectioned mold of the desired design. The piece of butter thus molded is then extracted from its mold by carefully prying it out with a fork or other instrument that will not mutilate it too severely.

At best, this is a time-consuming and wasteful procedure that produces relatively ill-defined and crude surfaced designs. Because butter is sticky at moldable temperatures, it is extremely difficult to remove from rigid molds without some mis-shaping. Intricate designs with delicate definition are impossible. Thus, this has been a manual art unadaptable to commercial utilization.

However, there is a distinct need among both home makers, who delight in giving well-appointed family and party meals, as well as restaurant owners and chefs, who are always looking for better ways to serve their customers, for a more presentable and decorative manner of serving butter patties without the high cost and time-consuming job of hand molding. Although much time and thought has been given to this by the butter industry, and several costly attempts have been made to fulfill this marked desire, there has been no answer to this commercial need.

An important difficulty standing in the way of realizing the above-mentioned desirable commercial product has been the unavailability of procedures to protect the body of butter in such a way as to preserve its unique spreading and flavor release characteristics under temperatures other than those heretofore used to produce butter patties. The manufacturers of butter have been loath to tamper with these characteristics because the acceptance and/or rejection of butter as a food is highly dependent upon the presence or absence of these characteristics. Here, we refer to the emulsified crystalline body of butter in its fat phase. It is this body structure that gives it the characteristic spreading smoothness and cooling flavor release as it decrystallizes and "breaks up" under mouth and tongue heat. To maintain these characteristics, butter has traditionally been processed and packaged at temperatures substantially under 70° F.

By contrast, when butter is processed into packages at substantially over 70° F., i.e., at temperatures which "break up" and de-emulsify its body, a commercially undesirable, grainy, poorly emulsified, body has been the result. Spreading smoothness and cooling flavor release are partially lost.

The instant invention makes use of the characteristics of butter which are presently considered liabilities for molding purposes (i.e., (1) its stickiness at any moldable temperature, and (2) its deemulsifying tendencies above 70° F.) and uses them in a manner which has turned them into assets. The instant invention takes butter at temperatures so high that it will flow under the influence of gravity, fill completely intricate-walled patty-sized molds, and stick tightly to the walls of such molds. Thereafter, the butter is cooled into a cast unit that perfectly accepts the shape and surface definition of the molds, from which chilled butter patties are ejected without damage.

It is, therefore, an object of the invention to provide a means for forming butter into small individual service-sized patties by fluid and/or semi-fluid casting of butter in pre-formed reversible package molds having at least one open side for ejection of the patty.

To understand the surprising nature of our processing innovation, and the importance of butter fluidity for casting patties, the following is set down:

(1) *The nature of butter and what this has meant for prior methods and means for making butter patties.—* Butter is essentially an emulsion (a colloidal suspension of a liquid in another liquid) of water and oil and a small amount of salt and solids which, at room temperature, is in a solidified or fat phase. In this crystallized or fat phase, it is marketable. Of all the marketed edible table fats, it is the only one which has a natural melting-point (de-crystallization or flavor release point) slightly below the temperature of the human body. With normal body temperature of about 98° F. and the emulsion break point of butter at approximately 92° F., it is the ideal natural fat to give the human tongue its most perfect fat flavor sensation.

Thus, it can be taken into the body as a fat (under 92° F.) with the physical convenience this provides, and quickly changed into an oil by the 98° F. temperature of body heat, reelasing as it de-crystallizes its essential flavor and coolant effect, while leaving the tongue free of any residual oily film. It is this natural quality of butter which margarine makers endeavor to tailor into their product, and it is this quality that must be recognized and protected when processing butter in a semi-fluid or fluid, but at the same time in a crystallized, or semi-crystallized state, or, in any event, in an emulsion-intact state. Once the emulsion has been completely broken by going above the 92° F. "break point," the flavor-releasing action produced by "breaking" of the emulsion is lost, and the body of the butter becomes grainy and salvy. It is desired that any fluid casting of butter into package molds be carried out below the top critical temperature of 92° F., or, if the temperautre rises above this "breakpoint," the emulison be maintained by physical agitation of the butter. It is obvious, of course, that as the temperature is lowered, butter becomes less fluid; its fluidity is such that it will flow at gravity when its temperature is above 90° while at 70° it is semi-fluid.

Prior methods of processing butter into packages have stayed well away from the critical emulsion "break-point" because some of the eleven fatty acids found in butterfat have melting points well under the composite breaking-point of 92° F. The following table shows the percentage and melting points of the several fatty acids that make up butter:

TABLE

| Fatty Acid | Range of Percentage | Melting Point, °F. |
|---|---|---|
| Linoleic | 0.0 to 5.4 | −0.6 |
| Caproic | 1.3 to 3.3 | 14.9 |
| Butyric | 2.2 to 5.5 | 17.6 |
| Oleic | 25.3 to 48.3 | 57.2 |
| Caprylic | 0.5 to 1.9 | 61.1 |
| Capric | 0.3 to 3.0 | 87.8 |
| Lauric | 2.6 to 7.7 | 118.4 |
| Myristic | 9.9 to 22.6 | 136.4 |
| Palmitic | 5.8 to 38.6 | 147.2 |
| Stearic | 1.8 to 20.4 | 158.2 |
| Arachidic | 0.0 to 1.2 | 170.6 |

It will be noted from the preceding table that it is possible to have well over 60% of the fatty acids in a given butter composition having a melting point under the composite "break-point" of 92° F. Note also that the largest fatty acid constituent of butter is oleic acid, which has a melting point of 57.2° F. Because of this, prior commercial production has (a) stayed well under the danger temperature zone beginning at about 70° F. and (b) used methods and machines that can only make patties when the butter is in a solid, rather than a semi-fluid or fluid, state.

(2) *The nature and purpose of packaging of the kind disclosed in the copending applications.*—Here reference is made to the copending applications, Serial No. 185,901, filed April 9, 1962; Serial No. 250,087, filed January 8, 1963; and Serial No. 206,591, filed March 20, 1963, all now abandoned.

All prior art in the field of butter patty packaging uses packaging simply as a protective carrier for the patty itself. Packaging has no part or function in the formtion of the patty. The patty is pre-formed as an integral complete piece, and then packaging materials are cut, folded, wrapped and/or modified over and/or around the patty to protect and carry it. According to my invention, the opposite takes place. It is the packaging that is pre-formed and it is the butter that is modified to fit into it. The package serves to protect and carry the patties, but it also does more—it serves as a casting mold which shapes and surface decorates the butter and, in a literal sense, it makes the patty. It is this cooperation and relationship between the package and butter that distinguishes my butter patty development from the prior art in this field, and it is the modification of the butter itself and the fluid casting of it into a preformed surface-decorated, reversible mold package that is of the essence of this cooperative accomplishment and as such constitutes an important feature of the invention.

Butter modification to the point at which it will flow at least partially at gravity is of the essence in this invention. The copending applications have described the extremely thin walls of the package mold and the delicacy of design within said walls. For butter to accept the shape and surface definitions of such thin-walled molds, without the mold walls having any backing support, it is apparent that butter enters the molds in a fluid or semifluid state. Pre-formed firm or nonflowable butter would hopelessly misshape and deform such delicate mold cavities.

(3) *The precise nature and purpose of patty shapes.*—The restaurant trade requires a butter patty to be of a uniform, defined shape and size, usually square or rectangular in shape and about ¼" thick; preferably with the large top side having an attractive decorative surface, and the opposite bottom side smooth and flat so that it can lie evenly on a serving plate.

To meet these specifications and purposes, we have found that the 20° F. "danger zone" temperature range (from 70° to 90° F., which is 2° under the 92° F. emulsion "break-point") provides a butter flowability for proper casting of the butter in our thin, decorative-walled, package molds, and also for leveling the flat surface by means of gravity or gravity plus slight mechanical pressures or movement. In this temperature range I am able to flow butter into our package molds and cast it into conforming shape without trapping air pockets that would distort the decorative surface, and at the same time vibrate or press the cast butter so as to level it on the open side of the mold to provide a flat-surfaced base for the patty without distorting the thin film mold.

An added benefit derives from our packaging in the production of patties made from whipped butter. Because whipped butter cannot be compressed or cut while cold without some damage to its air-cell-containing body and discoloring its surfaces, it is commercially impractical to make whipped butter patties using the methods and means of the prior art. Because my apparatus does not pre-form the patty, compress or cut cold butter, it provides a superior commercial way to produce whipped butter patties.

To summarize, then, it will be seen from the foregoing that the purpose of our packaging and the purpose of our patty shapes cannot be achieved commercially (i.e., with low cost, fast, automated, precision results) with butter that is cold and stiff or non-flowable. The industry has tried to do this and signally failed.

It is, therefore, an important object of the invention to produce commercially acceptable butter patties by fluid casting.

Another object of the invention is to provide a commercially practical apparatus by which the above-mentioned objective may be accomplished.

Still another object is to provide a commercially practical apparatus for producing the butter patties described in my above-mentioned applications.

Yet another object is to provide means that utilize those characteristics of butter that are found in the high temperature, "danger zone" (characteristics that hitherto have been considered liabilities and disadvantages in the processing and packaging of butter patties) in a manner that surprisingly makes them assets and advantages in the production of butter patties.

A further specific object is to cast fluid butter into intricate-surfaced mold bottoms so that the butter completely fills and tightly adheres to the surfaces of the mold without any substantial shape-deforming air pockets forming between the buttter and the mold walls.

Another specific object is to cast fluid butter into open-ended, patty-sized molds, and then level the butter on the open side of the mold into a substantially flat surface.

Other objects and advantages of the invention may be seen in the details of construction and operation set down in this specification.

The invention is explained in conjunction with the accompanying drawing, in which—

FIGS. 1 and 1A (when joined along the junction line A—A) constitute a fragmentary side elevational view of apparatus employed in the casting of butter patties;

FIG. 2 is a fragmentary top plan view of a pocket-equipped web employed in conjunction with the apparatus of FIG. 1;

FIG. 3 is a fragmentary enlarged top plan view of the portion of FIG. 2 shown within the circle designated 3 therein;

FIG. 4 is a fragmentary sectional view, taken along the sight line 4—4 of FIG. 3;

FIG. 5 is a perspective view of a typical butter patty producible according to the present invention.

FIG. 6 is a fragmentary cross-sectional view of the apparatus of FIG. 1 such as would be seen along the sight line 6—6 applied to FIG. 1;

FIG. 7 is an enlarged fragmentary sectional view of the central longitudinal portion of the apparatus of FIG. 1A showing the feed mechanism;

FIG. 8 is a transverse sectional view of the feed mechanism as would be seen along the sight line 8—8 of FIG. 1A.

Figure 5A:
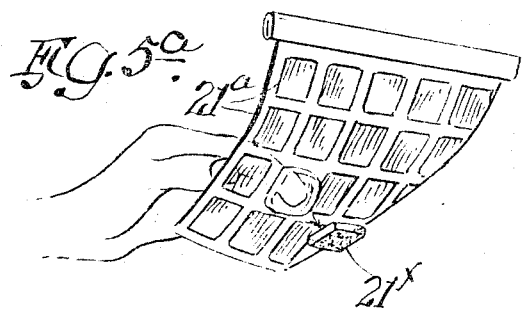
FIG. 5A is a perspective view of the patty being removed from its die.

Referring now to the drawing and in particular to FIGS. 1 and 1A, the numeral 20 designates generally the frame of the machine, which at one end is equipped with a roll of plastic web material such as 0.002" thick polyvinyl chloride, to provide the mold-equipped web for developing cast butter patties. The web is seen in FIGS. 2–4, and the resultant butter patty is seen in FIG. 5.

For this purpose, the apparatus of FIG. 1 is equipped with a web-molding section generally designated 22, a filling-casting section generally designated 23, a settling section generally designated 24, and a cut-off mechanism generally designated 25. The apparatus is operated primarily from the main drive motor 26 secured to an intermediate portion of the frame 20. A separate jogger motor 27 is also provided on the main frame 20 for leveling the cast butter within the mold in a fashion which will be described in greater detail hereinafter.

Power from the motor 26 is employed to advance the film or web from the roll 21 and through the mold forming section 22 wherein the film is subjected to a mold-forming operation to provide the embossed molds 21a (see FIGS. 3 and 4). In FIGS. 3-5, a variety of embossed designs can be seen, and ultimately the web is transversely severed as along lines 21b and 21c to provide handleable packages for a plurality of the butter patties.

Thus, the overall procedure contemplates unwinding film which may be the above-mentioned 2 mil thick unplasticized polyvinyl chloride, the film being free of plasticizer which may have a toxic character. Alternatively, unoriented Mylar (ethylene glycol terephthalate, marketed by E. I. du Pont de Nemours & Co., of Wilmington, Delaware), rigid polyethylene butyrate, or Saran (vinylvinylidene chloride, marketed by Dow Chemical Company, of Detroit, Michigan), may be used. Optimally, the molds 21a are sized to develop standard butter patties, which are one inch squares having a thickness of 1/4". Thus, the depth of the patty-forming mold 21a is slightly greater than 1/4" to permit leveling and prevent overflow. The plastic web extends continuously along the length of the apparatus of FIG. 1, with the major portion thereof being equipped with the molds 21a. The entire web is advanced incrementally through the various stations by apparatus which is now to be described in conjunction with the various mechanisms for mold-forming, casting, settling, and cut-off.

*Web supply mechanism*

Referring still to FIG. 1, the numeral 28 designates a pedestal bracket secured to the fram 20 which carries a journal 29 in which the cross shaft 30 of the web roll 21 is rotatably supported. Web material from the roll 21 is unwound and carried over the idler roll 31 (see the extreme left-hand portion of FIG. 1) and toward the web-shaping or mold-forming section 22.

For this purpose, the inventive apparatus is equipped with a first web carriage generally designated 32, which is mounted for horizontal reciprocatory movement in suitable ways on the frame 20. Provided on the carriage 32 are first and second grippers 33 and 34, respectively, which serve to grip the sides of the web issuing from the roll 21 so as to advance it toward the discharge end of the apparatus.

For the purpose of providing the reciprocal movement, the motor 26 is equipped with a chain and sprocket drive 35 which operates an intermediate or timing shaft 36 rotatably mounted on the frame 20. A second chain and sprocket drive 37 connects the timing shaft 36 with the main drive shaft 38, which is also rotatably mounted on the frame 20. The shaft 38 and certain of its associated component parts may also be seen in FIG. 6.

Fixed to the rotating main shaft 38 is the main drive cam 39, which serves to provide the reciprocatory motion characteristic of the first web carriage 32. This reciprocatory motion is achieved through a cam follower 40 rotatably carried by a cam follower arm 41. The cam follower arm 41 is fixed to a rocker shaft 42 (see also FIG. 6), and also fixed to the rocker shaft 42 is a lever arm 43, the lever arm 43 being pivotally connected to the first web carriage 32. Thus, as the cam 39 rotates the cam follower 40 in following the cam contour converts the rotational movement to a reciprocating action at the pivot point 43a.

During the forward movement of the carriage 32 (i.e., toward the discharge end of the apparatus), the grippers 33 and 34 engage the sides of the sheet along both longitudinal edges to advance the web sheet and thereby unroll the roll 21. At the end of the forward stroke, the grippers 33 and 34 are released, while stationary grippers to be described are energized to immobilize the sheet while the carriage 32 is retracted. Timing of the operation of the first and second movable grippers 33 and 34, respectively, and the alternative actuation of the stationary grippers is conveniently provided by a pneumatic system (not shown) associated with and operated by the timing shaft 36.

During the return or retraction movement of the first carriage 32, the web is stationary, and during this time the various operations associated with mold-forming, casting, jogging and cut-off mechanisms take place.

In the illustration given, each of these operations is achieved by a mechanism that operates along a vertical path transverse to the length of the web, and each operation is conveniently achieved through cam-controlled devices, only one of which will be described in detail for the purpose of explanation, and that relative to the shaping section 22.

*Mold-forming section*

The mold-forming section includes a heater 44 and a die 45 shaped according to the size and decorative character of the various molds 21a. Here, it will be appreciated that the molds 21a need not all have the same embossing or decorative design, and, preferably, groups of 12 different designs may be employed so as to provide variety in the resultant patties. Utilizing the above-mentioned 2 mil thick polyvinyl chloride film, a heater having a surface temperature of the order of 230–250° F. operates suitably to develop the molds 21a.

Cooperating with the heater 44 is the die or mold 45 into which the web is drawn under the influence of mechanical and pneumatic pressure in the fashion described in the Patent No. 3,033,737. For this purpose, both the heater 44 and the mold 45 are vertically reciprocated to engage the web, the heater 44 moving downwardly at the beginning of a web-forming operation, while the mold 45 moves upwardly. For this purpose, a cam shaft 46 (see FIG. 6) is suitably journaled within the main frame 20 and is driven by a chain and sprocket drive 47 which is coupled to the main drive shaft 38. The cam shaft 46 carries four cams, a pair of cams 48 on oppositie sides of the machine for actuating the mold 45, and a second pair of spaced-apart cams 49 for developing the movement of the heater 44. Associated with each heater cam 49 are a pair of cam followers 50 which are carried by a cam follower shaft 51. In like fashion, mold cam followers 52 are associated with the mold cams 48, and these in turn operate the mold cam follower shafts 53. As can be appreciated from FIG. 6, the caming mechanisms are symmetrical about the longitudinal center line except for the provision of the chain and sprocket drive 47. The rotational movement of the cams 48 and 49 is converted into a reciprocal motion of the shafts 51 and 53, respectively, whereby the heater 44 is lowered at the beginning of a forming cycle and the die 45 is elevated.

After the forming operation has been completed, the web is advanced a distance corresponding to the width of the mold 45, whereupon new film is available for a subsequent forming operation.

Ultimately, the mold-equipped web (see FIGS. 2–4) is advanced to a position under the filling head 54 which is provided as part of the casting mechanism generally designated.

Butter-casting section

A reservoir or hopper 55 is suitably mounted on the frame 20 so as to provide a continuous supply of butter fluidized by being maintained at a temperature in the range of 70–90° F. Advantageously, the butter may be "whipped," in which fluidization is enhanced through the incorporation therein of air in highly dispersed form, and which conventionally occupies about 50% of the volume of the butter.

During the time the continuous web is stationary, fluidized butter from the hopper 55 is simultaneously discharged into a plurality of the molds 21a, this operation being appreciated best from a consideration of FIG. 7.

In FIG. 7, it is seen that an oscillating cylinder 56 constituting a metering valve is associated with the bottom of the hopper 55 through the provision of a cylinder housing 57. When the cylinder is in the position wherein the flow channel 58 is in the dotted line position seen in FIG. 7, fluid butter flows out of the hopper 55 into a plunger guide tube 59. Subsequent rotation of the cylinder 56 brings it to the condition wherein the flow passage 58 is seen in solid line, whereupon the fluid butter is communicated with the filling head 54. Serving to expel and inspire the fluid butter is a plunger 59a suitably operated by a mechanism 59b (see FIG. 1), deriving power from the main drive motor 26. Thus, during the time the web is not being advanced by the first web carriage 32, the plunger 59a expels fluid butter through the passage 58 and into the filling head 54 for discharge through the nozzles 54a into the molds 21a. As seen in FIG. 7, the extreme right-hand molds are filled, while the five molds under the filling head are in the process of being filled, there being an intervening unmolded area as at 21b which is ultimately used for transversely severing the film into discrete segments, each having a plurality of molds 21a.

Figure 9:
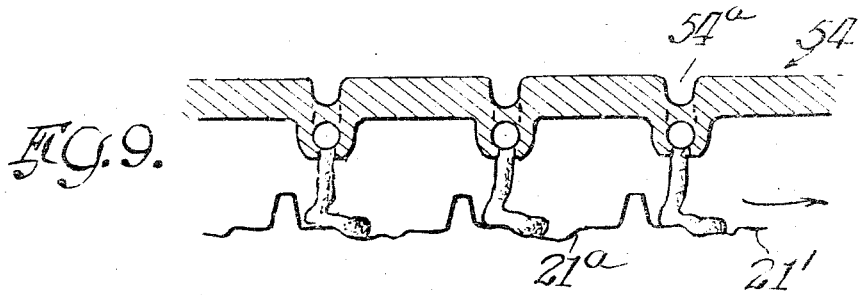
FIGS. 9–11 are fragmentary sectional views of the feed portion of the apparatus shown in the process of delivering a stream of fluidized butter to the patty molds.
Figure 10:
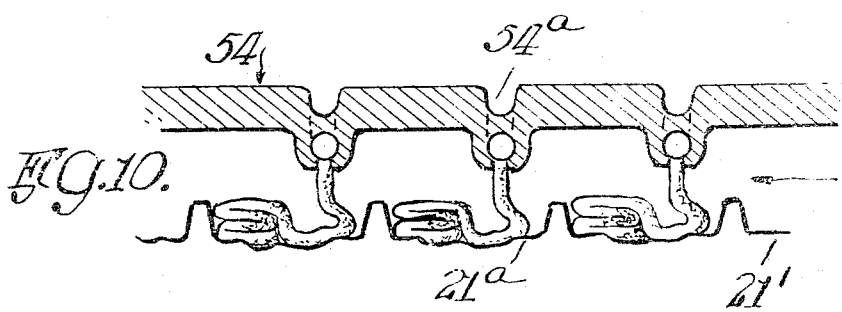
Figure 11:
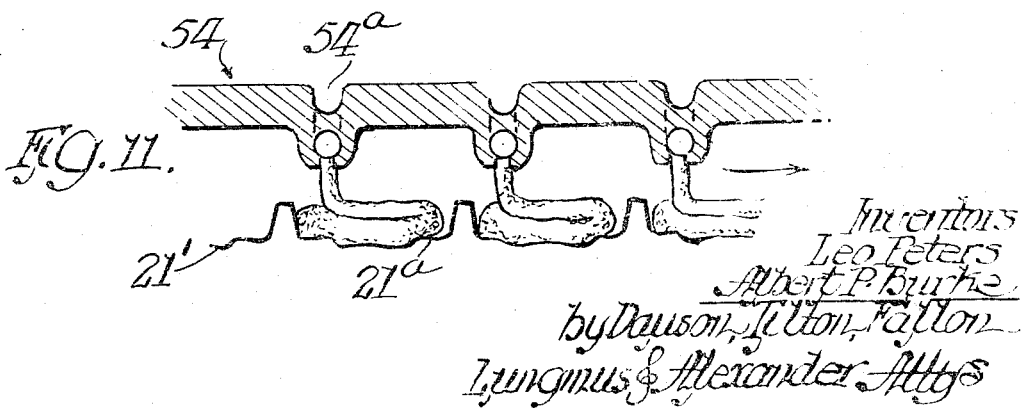

The filling operation is pictorially shown in FIGS. 9–11, wherein the various stages are seen in sequence. Referring to FIG. 9, and understanding that the film 21' proceeds to the right in advancing toward the discharge or cut-off point, it will be seen that the nozzles 54a are positioned above the rear portion of each mold 21a. During the first one-third to one-half of the casting cycle, the film 21' is in the FIG. 9 position relative to the fixed nozzles 54a. In other words, the film 21' has been advanced by the various carriages a distance sufficient to position the middle of the mold 21a forwardly of the nozzle 54a.

After about one-half of the casting cycle has been completed, the film 21' is subjected to a retrograde movement, as illustrated in FIG. 10, wherein the film 21' is actually retracted a slight distance, i.e., about one-half the longitudinal dimension of the mold 21a. This positions the forward one-half of each mold 21a under its associated nozzle 54a, as is depicted in FIG. 10.

At about the conclusion of the casting cycle, the film 21' is advanced toward discharge, now under the influence of the various carriages, so as to develop an overlying tail which facilitates the ultimate casting operation within the molds.

Aiding in the discharge of the fluid butter through the nozzles 54a is an O-ring 60 provided on the plunger 59a and a suitable driving mechanism for the oscillating cylinder 56 which includes a linkage connection 61 operatively associated with the cross drive shaft 62 (see FIG. 1). Thus, rotational power is delivered to the drive shaft 62 through a suitable chain and sprocket system 62a, and this in turn is utilized to power the eccentrically connected linkage element 61 and the reciprocating plunger 59a. For the purpose of supporting the mold-equipped web 21' under the filling head 54, a supporting structure 63 in the nature of an "egg crate" is provided, made up of longitudinally-extending bars 63a and transverse interconnecting bars 63b (see FIG. 8). The supporting structure 63 is the mechanism employed to give the above-mentioned retrograde movement to the mold-equipped film 21' illustrated in FIG. 10. For this purpose, the supporting structure 63 is first elevated into engagement with the mold-equipped film 21' through mechanism illustrated in FIGS. 7 and 8. For this purpose, the structure 63 is supported on a vertically and horizontally reciprocatable carriage generally designated 64, with the mechanism providing the vertical reciprocation being generally designated by the numeral 65. This includes a chain and sprocket drive mechanism 66 (designated only in FIG. 1), which couples the drive shaft 62 to a cross shaft 68 which is also suitably journaled in the frame 20 as seen in FIG. 8. The cross shaft 68 carries a cam 69 which actuates cam followers 70 in a manner analogous to that previously described with respect to the heater 44 and mold 45. The cam followers are each carried by brackets 71 which are fixed to a vertically reciprocatable shaft 72, the shaft 72 at its upper end being fixed to the carriage 64.

After the carriage 64 has been elevated sufficiently to have its associated supporting structure 63 engage the mold-equipped film 21', and the rear portion of each mold 21a filled as illustrated in FIG. 9, another cam 73 (seen only in FIG. 8) operates a rocker arm 74 (see FIG. 7) through a suitable cam follower 73a and cam follower arm 73b. The rocker arm 74 is connected by means of a lever linkage 75 to the carriage 64 as seen in FIG. 7 so as to retract the film 21' to the FIG. 10 condition. Provided for the purpose of intermittently advancing the web 21' between casting operations as just outlined, is a second web carriage 76 which is slidably mounted on the frame 20 for horizontal reciprocatory action. Still further, a third web carriage generally designated 77 is provided for the same purpose, the third web carriage being positioned for movement between the settling mechanism 24 and the cut-off mechanism 25. Each of the second and third carriages 76 and 77 are equipped with grippers as at 76a and 77a, respectively, for engaging the sides of the film during the forward portion of the reciprocatory cycle. The carriage 64 which is positioned for orbital movement under the filling head 54, is equipped with grippers as at 78 in FIG. 8 for the purpose of confining the film when the grippers 76a and 77a are in unactuated condition. In similar fashion, the frame 20 adjacent the discharge end, i.e., the cut-off mechanism 29, is equipped with a second stationary gripper mechanism at 79 (see FIG. 1) also for the purpose of restricting web movement during retraction of the various carriages.

The carriages 76 and 77 are interconnected by connecting rods as at 80, while the first and second carriages are similarly connected by connecting rods as at 81 (see FIG. 1). The point of connection between the connecting rods 81 and the first carriage 32 as at 81a, includes an adjustable feature so as to insure that the molds 21a are properly beneath the filling head at the commencement of a filling-casting cycle.

Once the molds 21a have been filled as in FIG. 11, and here it will be appreciated that the configuration of the thin, relatively wide ribbon substantially minimizes the presence of air pockets, the web 21' is advanced into position over a settling or jogging device for completion of the filling-casting operation.

Settling section

Referring to FIG. 1A, the numeral 82 designates a chain and sprocket drive coupling a speed reducer 83 to a cross shaft 84, the speed reducer 83 being powered by the jogger motor 27. Fixed to the cross shaft 84 is a cam 85 which operates against reciprocatable cam followers in the fashion illustrated relative to the mold-forming and butter-casting sections.

A cam responsive mechanism is designated 86 and is coupled to a support structure including a plurality of side-by-side jogger rails 87 which are longitudinally aligned with the rails 63a as seen in FIG. 1A. The action of the jogger rails 87 under the influence of the cam 85 is more in the nature of a jog than a smooth reciprocation, imparting a slight but sudden jolt to the rails 87 of the order of a quarter of an inch and in the range of 200 to 300 times per minute, whereby the top open surface of the moldcast fluidized butter becomes smooth. This ultimately provides a smooth flat base for the butter patty to rest on when the web 21' is inverted and the chilled-cast patties released according to the teaching in the above-mentioned earlier applications.

Following the settling or jogging operation, the smooth-topped patties are advanced to the cut-off mechanism which incorporates a reciprocating mechanism 88 for the purpose of transversely severing the web 21' as along the lines 21b and 21c. This provides discrete film segments, each of which may comprise upwards of 80 individual molds 21a. In the illustrated embodiment, the severed segments carry 80 such molds and measures about 6" x 18", whereby handling is facilitated. Suitable mechanism (not shown) is provided at the discharge point in FIG. 1 for supporting the severed segments for transfer to refrigeration whereby the temperature of the mold-cast butter is reduced to about 40° F., and the butter hardened to an integrally-cohesive, fully cast unit easily removable from its mold.

It is believed that the practice of the invention will be facilitated by a summary of the operations just described, and for that reason the following is set down.

*Operation*

A first web carriage generally designated 32 (see FIG. 1) is horizontally reciprocably mounted on a frame 20 and actuated by the main drive motor 26. On the forward motion of the first web carriage 32, the grippers 33 and 34 engage the web 21' along each longitudinal side thereof to advance the web incrementally. During retraction of the first web carriage 32, the web 21' is stabilized by the provision of essentially stationary grippers 78 (see FIG. 8) provided as part of a filling head carriage 63.

During the retraction of the first web carriage 32, cams operated from the main drive shaft 38 move a heater 44 downwardly and a die 45 upwardly into contact with the film 21' to develop the embossed molds 21a seen in FIGS. 3 and 4. The heater may be equipped with a face that confronts the film, the die 45 being relatively chilled and equipped with vacuum connections for drawing the heated film into the die pockets. Ordinarily, this operation can be performed in the time of about one to one and one-half seconds.

Contemporaneously with the forward, i.e., toward discharge, movement of the first web carriage 32, there are similar movements of the second and third web carriages 76 and 77 (see FIG. 1A). These carriages, like the first carriage 32, are equipped with grippers as at 76a and 77a, which again confine the longitiudinal edges of the film. During retraction of the second and third carriages, which are tied together by means of connecting rods 80, with the carriage 76 being connected to the first carriage 32 by means of connecting rod 81, the film 21' is substantially immobilized. A slight movement is provided both under the filling head 54 and over the jogger rails 87.

The slight movement under the filling head 54 is seen in FIGS. 9–11, where the rear portion of the mold 21a is first filled, and ultimately, after the forward portion has been filled as seen in FIG. 10, the advancement of the web 21' develops a reversely folded tail as at 21d in FIG. 11.

At the jogging or settling section, a high point cam as at 85 develops a series of jolts or impacts which cause the ribbon-like folds of FIG. 11 to become eradicated and a homogeneous mold-less patty of the character of FIG. 5 develops.

The cast butter is thus agitated to develop a flat upper surface. It will be appreciated that other forms of settling may be employed which include sonic vibrations, mechanical pressing, accentric mechanical vibration, etc. We prefer a bottom impact, however, since this eliminates the need for any mechanism above the tray of patties which makes access difficult, inspection somewhat more complicated, and provides some problems of cleaning and maintenance.

The operation is advantageously carried out with the butter temperature around 85° F. so as to make available the slightly greater fluidity of butter in the higher range of the "danger zone," but maintaining the temperature sufficiently below 92° F. so as not to bring about a breakdown of the emulsion characteristic of good butter. Fluidity is somewhat enhanced by whipping the butter prior to entry into the hopper 55. In the past, whipped butter has presented a real packaging problem, since any pressure has upset the weight and uniformity of the air distribution. Heretofore, highly whipped butter has been marketed in cups, as contrasted to rectangular shapes employed for unwhipped butter.

In the practice of the invention, we find it advantageous to provide the butter sufficiently fluid to change its shape under vibration or impact, but essentially too stiff to settle into its mold without appreciable mechanical force.

Ultimately, the segments of film as at 21e (defined by the transverse lines of severance 21b and 21c) are refrigerated into condition suitable for removal of the discrete individually cast butter patties 21f of FIG. 5 as by the operation illustrated in FIG. 5A, or mechanically through the application of pressure when the perimetric edges of the segment 21e are confined in the fashion illustrated in the above-mentioned application Serial No. 266,591, filed March 20, 1963.

While in the foregoing specification a detailed description of an embodiment of the invention has been set down for the purpose of explanation thereof, many variations in the details herein given may be made by those skilled in the art without departing from the spirit and scope of the invention. And it is understood that, while this invention is described with the use of butter, it applies also to such related foods as margarine, processed cheese, jellies, chocolates, and any other substance which may be processed in a fluid phase and consumed in a solid phase.

We claim:

1. In apparatus for the casting of butter patties, or the like, an elongated frame, means at one end of said frame for providing a continuous web of flexible thermoplastic material, means on said frame adjacent said one end for developing transverse rows of embossed molds in said web, means on said frame intermediate the ends thereof for simultaneously filling a transverse row of said molds with fluidized butter, and means adjacent the other end of said frame for mechanically settling said butter to develop a substantially flat top surface on the butter in said molds.

2. The structure of claim 1 in which said frame is equipped with an orbital carriage operatively associated with said filling means to provide a slight retrograde movement of said web during filling of said molds.

3. The structure of claim 1 in which said frame is equipped with a plurality of web carriages, each carriage being equipped with gripping means for confining the edges of said web thereagainst, one of said carriages being operatively associated with said filling means and another with the means for forming molds in said web, and means adjustably connecting the last-mentioned carriages.

4. The structure of claim 1 in which said settling means includes a plurality of support rails for supporting the mold-equipped web, and means including a movable high point cam for joggling said rails.

5. In apparatus for casting butter patties, or the like, an elongated frame, a source of thermoplastic web material mounted adjacent one end of said frame, a first carriage on said frame for incrementally advancing said web, mold-forming heater and die means on said frame adjacent said one end for developing molds in said film when said first carriage is not advancing said film, a second carriage coupled to said first carriage and spaced longitudinally therefrom on said frame for advancing said film, a filling head mounted on said frame for delivering fluid food material to the web molds between the times said second carriage is advancing said web, a filling head carriage under said filling head mounted on said frame for orbital movement of the mold-equipped web relative to said filling head, said filling head carriage being equipped with gripping means for immobilizing said web relative to said filling head carriage during filling of said molds, a third carriage on said web coupled to said second carriage for advancing said web, and joggling means reciprocably mounted on said frame for engagement with the bottom of said web adjacent said third carriage between the times said third carriage is advancing said web, and stationary gripper means on said frame adjacent said joggling means for immobilizing the longitudinal edges of said web adjacent said joggling means.

References Cited by the Examiner
UNITED STATES PATENTS 2,980,539    4/1961    Bevarly _____ 99—179 X
3,033,737    5/1962    Peters _____ 156—486

SAMUEL KOREN, *Primary Examiner.*
ALDRICH F. MEDBERY, *Examiner.*